(12) United States Patent
Liu et al.

(10) Patent No.: US 8,982,737 B2
(45) Date of Patent: Mar. 17, 2015

(54) METHOD, DEVICE AND SYSTEM FOR IMPLEMENTING CONFERENCE ACCESS

(71) Applicant: Huawei Technologies Co., Ltd., Shenzhen, Guangdong (CN)

(72) Inventors: Ji Liu, Hangzhou (CN); Jie Wu, Hangzhou (CN); Yu Yin, Nanjing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/138,590

(22) Filed: Dec. 23, 2013

(65) Prior Publication Data

US 2014/0185492 A1  Jul. 3, 2014

Related U.S. Application Data

(63) Continuation of application No. PCT/CN2012/088092, filed on Dec. 31, 2012.

(51) Int. Cl.
| | |
|---|---|
| *H04L 12/18* | (2006.01) |
| *H04L 29/06* | (2006.01) |
| *H04M 3/56* | (2006.01) |
| *H04M 3/00* | (2006.01) |
| *H04M 3/42* | (2006.01) |

(52) U.S. Cl.
CPC ............ *H04L 65/403* (2013.01); *H04L 12/18* (2013.01); *H04M 3/00* (2013.01); *H04L 65/4038* (2013.01); *H04M 3/563* (2013.01); *H04M 2203/5009* (2013.01); *H04M 3/42059* (2013.01); *H04M 2203/5063* (2013.01)
USPC ............ 370/261; 370/260; 709/204; 715/753

(58) Field of Classification Search
None
See application file for complete search history.

(56) References Cited

U.S. PATENT DOCUMENTS

| | | | | |
|---|---|---|---|---|
| 6,463,038 | B1* | 10/2002 | Wilson ......................... | 370/261 |
| 2005/0078612 | A1* | 4/2005 | Lang .............................. | 370/260 |
| 2005/0249346 | A1* | 11/2005 | Schnurr ................... | 379/355.02 |
| 2006/0101143 | A1* | 5/2006 | Garcia et al. ................. | 709/225 |
| 2007/0121859 | A1* | 5/2007 | Smelyansky et al. ......... | 379/158 |
| 2008/0037748 | A1* | 2/2008 | Jefferson et al. .......... | 379/202.01 |
| 2008/0279118 | A1* | 11/2008 | Hyun et al. ................... | 370/260 |
| 2010/0034369 | A1* | 2/2010 | Lederer ..................... | 379/218.01 |
| 2011/0182415 | A1* | 7/2011 | Jacobstein et al. ........ | 379/202.01 |

FOREIGN PATENT DOCUMENTS

| | | |
|---|---|---|
| CN | 101394294 A | 3/2009 |
| CN | 102438084 A | 5/2012 |
| CN | 102763401 A | 10/2012 |
| EP | 2040494 A1 | 3/2009 |
| WO | 2006115730 A2 | 11/2006 |
| WO | 2011097136 A2 | 8/2011 |

* cited by examiner

*Primary Examiner* — Ayaz Sheikh
*Assistant Examiner* — Tarell Hampton
(74) *Attorney, Agent, or Firm* — Leydig, Voit & Mayer, Ltd.

(57) ABSTRACT

A method for conference access includes: receiving, by a switchboard device, a first call request sent by a user terminal, where a calling identifier included by the first call request is an identifier of the user terminal, and the included called identifier is a switchboard number corresponding to the switchboard device; obtaining, according to the identifier of the user terminal, recorded information about a conference corresponding to a call missed by the user terminal, where the information about the conference includes an access number of a conference system to which the conference belongs and a conference identifier of the conference; and enabling the user terminal to access the conference. When a user misses answering a conference-related call, by dialing a switchboard number, the user may directly accesses a conference, thereby improving the efficiency of accessing the conference.

18 Claims, 8 Drawing Sheets

METHOD, DEVICE AND SYSTEM FOR IMPLEMENTING CONFERENCE ACCESS

CROSS-REFERENCE TO RELATED APPLICATIONS

This application is a continuation of International Patent Application No. PCT/CN2012/088092, filed on Dec. 31, 2012, which is hereby incorporated by reference in its entirety.

TECHNICAL FIELD

The present invention relates to the field of conference technologies, and in particular, to a method, device and system for implementing conference access.

BACKGROUND

At present, an enterprise communication system generally provides an enterprise switchboard service and a conference service. When a conference system calls an external user to access a conference, it may call a terminal of the external user through a switchboard, and the calling number displayed on the terminal of the external user is the switchboard number of the enterprise. If the external user misses the call, when dialing the number of the missed call (that is, the switchboard number) subsequently, the external user usually hears a switchboard prompt tone "please dial the extension number", or is provided with a voice self-service "please perform a self-service operation according to the prompt tone", but cannot access the conference corresponding to the missed call. If a user needs to access the conference, the user further needs to find an access number of a conference system to which the conference belongs and a conference identifier of the conference, and access the conference using the access number and the conference identifier, which is low in efficiency.

SUMMARY

Embodiments of the present invention provide a method, device and system for implementing conference access, for solving the problem in the prior art that a user cannot access a conference by dialing a switchboard number when missing a conference-related call.

In a first aspect, a method for implementing conference access is provided, where the method includes:

receiving, by a switchboard device through an enterprise call control system, a first call request sent by a user terminal, where the first call request includes a calling identifier and a called identifier, the calling identifier is an identifier of the user terminal, and the called identifier is a switchboard number corresponding to the switchboard device;

obtaining, by the switchboard device, according to the identifier of the user terminal, recorded information about a conference that is initiated by a conference system to the user terminal through the switchboard device and corresponding to a call missed by the user terminal, where the call missed by the user terminal is initiated by the conference system to the user terminal through the switchboard device, and the information about the conference includes an access number of the conference system and a conference identifier of the conference; and enabling, by the switchboard device, the user terminal to access the conference according to the access number of the conference system and the conference identifier of the conference.

In a first possible implementation manner of the first aspect, the first call request includes media information of the user terminal; and the enabling, by the switchboard device, the user terminal to access the conference according to the access number of the conference system and the conference identifier of the conference specifically includes: instructing, by the switchboard device, the enterprise call control system to send a second call request that carries the conference identifier, the identifier of the user terminal, and the media information of the user terminal to the conference system corresponding to the access number, so that the conference system sends media information corresponding to the conference identified by the conference identifier to the user terminal to enable the user terminal to access the conference.

In a second possible implementation manner of the first aspect, the enabling, by the switchboard device, the user terminal to access the conference according to the access number of the conference system and the conference identifier of the conference specifically includes: instructing, by the switchboard device, the enterprise call control system to send a response message used for rejecting the first call request to the user terminal; and sending call instruction information to the conference system corresponding to the access number, where the call instruction information includes the conference identifier and the identifier of the user terminal, for instructing the conference system to call the user terminal identified by the identifier of the user terminal, so as to enable the user terminal to access the conference identified by the conference identifier.

With reference to the first aspect, and the first or second possible implementation manner of the first aspect, in a third possible implementation manner, before the receiving, by a switchboard device through an enterprise call control system, a first call request sent by a user terminal, the method further includes: when the conference system calls, through the switchboard device, the user terminal to access the conference and determines that the user terminal misses the call, recording, by the switchboard device, the access number of the conference system and the conference identifier of the conference.

With reference to the third possible implementation manner of the first aspect, in a fourth possible implementation manner, the when the conference system calls, through the switchboard device, the user terminal to access the conference and determines that the user terminal misses the call, recording, by the switchboard device, the access number of the conference system and the conference identifier of the conference specifically includes:

receiving, by the switchboard device, a third call request sent by the conference system for calling the user terminal to access the conference, where a calling identifier in the third call request is the access number of the conference system;

modifying, by the switchboard device, the third call request, so as to replace the access number in the third call request with the switchboard number corresponding to the switchboard device, and sending the modified third call request to the user terminal; and when determining that the user terminal misses the call, recording, by the switchboard device, the access number of the conference system in the third call request, obtaining the conference identifier of the conference from the conference system, and recording the obtained conference identifier.

With reference to the third possible implementation manner of the first aspect, in a fifth possible implementation manner, the when the conference system calls, through the switchboard device, the user terminal to access the conference and determines that the user terminal misses the call, recording, by the switchboard device, the access number of the conference system and the conference identifier of the conference specifically includes:

receiving, by the switchboard device, a fourth call request sent by the conference system for calling the user terminal to access the conference, where a calling identifier in the fourth call request is the access number of the conference system, and the fourth call request further includes the conference identifier of the conference;

modifying, by the switchboard device, the fourth call request, so as to replace the access number in the fourth call request with the switchboard number corresponding to the switchboard device, and sending the modified fourth call request to the user terminal; and when determining that the user terminal misses the call, recording, by the switchboard device, the access number of the conference system in the fourth call request and the conference identifier of the conference.

With reference to the first aspect and any one of the first to fifth possible implementation manners of the first aspect, in a sixth possible implementation manner, the information about the conference further includes description information of the conference; and before the enabling, by the switchboard device, the user terminal to access the conference according to the access number of the conference system and the conference identifier of the conference, the method further includes: instructing, by the switchboard device, the enterprise call control system to play the description information of the conference to the user terminal.

With reference to the sixth possible implementation manner of the first aspect, in a seventh possible implementation manner, after the instructing, by switchboard device, the enterprise call control system to play the description information of the conference to the user terminal, and before the enabling the user terminal to access the conference according to the access number of the conference system and the conference identifier of the conference, the method further includes:

instructing, by the switchboard device, the enterprise call control system to play confirmation prompt information to the user terminal, to prompt a user to which the user terminal belongs to confirm the conference to be accessed; and receiving, by the switchboard device, a confirmation result that confirms the conference to be accessed and is sent by the user terminal, and determining, according to the confirmation result, to enable the user terminal to access the conference.

With reference to the sixth or seventh possible implementation manner of the first aspect, in an eighth possible implementation manner, before the receiving, by a switchboard device through an enterprise call control system, a first call request sent by a user terminal, the method further includes: when the conference system calls, through the switchboard device, the user terminal to access the conference and the user terminal misses the call, recording, by the switchboard device, the description information of the conference.

With reference to the eighth possible implementation manner of the first aspect, in a ninth possible implementation manner, before the recording the description information of the conference, the method further includes: obtaining the description information of the conference from the conference system.

In a second aspect, a switchboard device is provided, where the switchboard device includes: a receiving unit, an obtaining unit and an access unit, where the receiving unit is configured to receive, through an enterprise call control system, a first call request sent by a user terminal, where the first call request includes a calling identifier and a called identifier, the calling identifier is an identifier of the user terminal, and the called identifier is a switchboard number corresponding to the switchboard device; and is configured to transmit the first call request to the obtaining unit;

the obtaining unit is configured to receive the first call request from the receiving unit, and obtain recorded information about a conference corresponding to a call missed by the user terminal according to the identifier of the user terminal included in the first call request, where the call missed by the user terminal is initiated by a conference system to the user terminal through the switchboard device, and the information about the conference includes an access number of the conference system and a conference identifier of the conference; and is configured to transmit the access number of the conference system and the conference identifier of the conference to the access unit; and the access unit is configured to receive the access number of the conference system and the conference identifier of the conference from the obtaining unit, and enable the user terminal to access the conference according to the access number of the conference system and the conference identifier of the conference.

In a first possible implementation manner of the second aspect, the access unit is specifically configured to receive the information about the conference from the obtaining unit, and instruct the enterprise call control system to send a second call request that carries the conference identifier, the identifier of the user terminal, and media information of the user terminal to the conference system corresponding to the access number, so that the conference system sends media information corresponding to the conference identified by the conference identifier to the user terminal to enable the user terminal to access the conference.

In a second possible implementation manner of the second aspect, the access unit is specifically configured to receive the information about the conference from the obtaining unit, instruct the enterprise call control system to send a response message used for rejecting the first call request to the user terminal, and send call instruction information to the conference system corresponding to the access number, where the call instruction information includes the conference identifier and the identifier of the user terminal, for instructing the conference system to call the user terminal identified by the identifier of the user terminal, so as to enable the user terminal to access the conference identified by the conference identifier. With reference to the second aspect, and the first or second possible implementation manner of the second aspect, in a third possible implementation manner, the switchboard device further includes a judging unit and a recording unit, where the judging unit is configured to: when the conference system calls, through the switchboard device, the user terminal to access the conference, determine whether the user terminal misses the call, and transmit a judgment result to the recording unit; and the recording unit is configured to receive the judgment result from the judging unit, and when the judgment result is yes, record the access number of the conference system and the conference identifier of the conference.

With reference to the third possible implementation manner of the second aspect, in a fourth possible implementation manner, the switchboard device further includes a call unit, where the call unit is configured to receive a third call request sent by the conference system for calling the user terminal to access the conference, where a calling identifier in the third call request is the access number of the conference system, and is further configured to modify the third call request, so as to replace the access number in the third call request with the switchboard number corresponding to the switchboard device, and send the modified third call request to the user terminal; and the recording unit is specifically configured to receive the judgment result from the judging unit, and when the judgment result is yes, record the access number of the conference system in the third call request, and record the conference identifier of the conference obtained from the conference system; or, the call unit is configured to receive a fourth call request sent by the conference system for calling the user terminal to access the conference, where a calling identifier in the fourth call request is the access number of the conference system, and the fourth call request further includes the conference identifier of the conference, and is configured to modify the fourth call request, so as to replace the access number in the fourth call request with the switchboard number corresponding to the switchboard device, and send the modified fourth call request to the user terminal; and the recording unit is specifically configured to receive the judgment result from the judging unit, and when the judgment result is yes, record the access number of the conference system and the conference identifier of the conference in the fourth call request.

With reference to the second aspect, and any one of the first to fourth possible implementation manners of the second aspect, in a fifth possible implementation manner, the switchboard device further includes a play instruction unit;

the information about the conference further includes description information of the conference;

the obtaining unit is further configured to transmit the obtained description information of the conference to the play instruction unit; and the play instruction unit is configured to receive the description information of the conference from the obtaining unit, and is configured to instruct the enterprise call control system to play the description information of the conference to the user terminal.

With reference to the fifth possible implementation manner of the second aspect, in a sixth possible implementation manner, the play instruction unit is further configured to instruct the enterprise call control system to play confirmation prompt information to the user terminal, so as to prompt a user to which the user terminal belongs to confirm the conference to be accessed;

the receiving unit is further configured to receive a confirmation result that confirms the conference to be accessed and is sent by the user terminal, and transmit the confirmation result to the access unit; and the access unit is specifically configured to receive the confirmation result from the receiving unit, receive the access number of the conference system and the conference identifier of the conference from the obtaining unit, and is configured to: when it is determined, according to the confirmation result, to enable the user terminal to access the conference, enable the user terminal to access the conference according to the access number of the conference system and the conference identifier of the conference.

With reference to the fifth or sixth possible implementation manner of the second aspect, in a seventh possible implementation manner, the recording unit is further configured to: when the judgment result is yes, record the description information of the conference.

With reference to the seventh possible implementation manner of the second aspect, in an eighth possible implementation manner, that the recording unit is configured to: when the judgment result is yes, record the description information of the conference specifically includes: the recording unit is configured to: when the judgment result is yes, record the description information of the conference obtained from the conference system.

In a third aspect, a communication system is provided, where the communication system includes: an enterprise call control system and the switchboard device according to the third aspect or any one of the first to eighth possible implementation manners of the third aspect.

In a first possible implementation manner of the third aspect, the communication system further includes a conference system.

In a fourth aspect, a switchboard device is provided, and the switchboard device includes: a processor, a transmitter, a receiver, a memory, and a bus, where mutual communications between the processor, the transmitter, the receiver, and the memory are completed using the bus;

the memory is configured to store a program, where the program includes an obtaining unit and an access unit;

the processor, is configured to execute the program stored by the memory;

the receiver is configured to receive, through an enterprise call control system, a first call request sent by a user terminal, where the first call request includes a calling identifier and a called identifier, the calling identifier is an identifier of the user terminal, and the called identifier is a switchboard number corresponding to the switchboard device;

the obtaining unit is configured to obtain, according to the identifier of the user terminal included in the first call request, recorded information about a conference corresponding to a call missed by the user terminal, where the call missed by the user terminal is initiated by a conference system to the user terminal through the switchboard device, and the information about the conference includes an access number of the conference system and a conference identifier of the conference; and the access unit is configured to enable the user terminal to access the conference according to the access number of the conference system and the conference identifier of the conference.

In a first possible implementation manner of the fourth aspect, the access unit is specifically configured to instruct the enterprise call control system to send a second call request that carries the conference identifier, the identifier of the user terminal, and media information of the user terminal to the conference system corresponding to the access number, so that the conference system sends media information corresponding to the conference identified by the conference identifier to the user terminal to enable the user terminal to access the conference. In a second possible implementation manner of the fourth aspect, the access unit is specifically configured to instruct the enterprise call control system to send a response message used for rejecting the first call request to the user terminal, and send call instruction information to the conference system corresponding to the access number, where the call instruction information includes the conference identifier and the identifier of the user terminal, for instructing the conference system to call the user terminal identified by the identifier of the user terminal, so as to enable the user terminal to access the conference identified by the conference identifier.

With reference to the fourth aspect, and the first or second possible implementation manner of the fourth aspect, in a third possible implementation manner, the program further includes a judging unit and a recording unit, where the judging unit is configured to: when the conference system calls, through the switchboard device, the user terminal to access the conference, determine whether the user terminal misses the call; and the recording unit is configured to: when a judgment result of the judging unit is yes, record the access number of the conference system and the conference identifier of the conference.

With reference to the third possible implementation manner of the fourth aspect, in a fourth possible implementation manner, the program further includes a call unit, where the call unit is configured to receive a third call request sent by the conference system for calling the user terminal to access the conference, where a calling identifier in the third call request is the access number of the conference system, and is further configured to modify the third call request, so as to replace the access number in the third call request with the switchboard number corresponding to the switchboard device, and send the modified third call request to the user terminal; and the recording unit is specifically configured to: when the judgment result is yes, record the access number of the conference system in the third call request, and record the conference identifier of the conference obtained from the conference system; or, the call unit is configured to receive a fourth call request sent by the conference system for calling the user terminal to access the conference, where a calling identifier in the fourth call request is the access number of the conference system, and the fourth call request further includes the conference identifier of the conference, and is configured to modify the fourth call request, so as to replace the access number in the fourth call request with the switchboard number corresponding to the switchboard device, and send the modified fourth call request to the user terminal; and the recording unit is specifically configured to: when the judgment result is yes, record the access number of the conference system and the conference identifier of the conference in the fourth call request.

With reference to the fourth aspect, and any one of the first to fourth possible implementation manners of the fourth aspect, in a fifth possible implementation manner, the program further includes a play instruction unit; and the information about the conference obtained by the obtaining unit further includes description information of the conference; and the play instruction unit is configured to instruct the enterprise call control system to play the description information of the conference to the user terminal.

With reference to the fifth possible implementation manner of the fourth aspect, in a sixth possible implementation manner, the play instruction unit is further configured to instruct the enterprise call control system to play confirmation prompt information to the user terminal, to prompt a user to which the user terminal belongs to confirm the conference to be accessed;

the receiver is further configured to receive a confirmation result that confirms the conference to be accessed and is sent by the user terminal; and the access unit is specifically configured to: when it is determined, according to the confirmation result, to enable the user terminal to access the conference, enable the user terminal to access the conference according to the access number of the conference system and the conference identifier of the conference.

With reference to the fifth or sixth possible implementation manner of the fourth aspect, in a seventh possible implementation manner, the recording unit is further configured to: when the judgment result is yes, record the description information of the conference.

With reference to the seventh possible implementation manner of the fourth aspect, in an eighth possible implementation manner, that the recording unit is configured to: when the judgment result is yes, record the description information of the conference specifically includes: the recording unit is configured to: when the judgment result is yes, record the description information of the conference obtained from the conference system.

In a fifth aspect, a computer program product is provided, where the computer program product includes computer program code, and when the computer program code is performed by a computer, the computer program code may enable the computer to perform steps in the first aspect or any one of the first to ninth possible implementation manners of the first aspect.

In a sixth aspect, a computer readable storage medium is provided, where the computer readable storage medium stores computer program code, and when the computer program code is performed by a computer, the computer program code may enable the computer to perform steps in the first aspect or any one of the first to ninth possible implementation manners of the first aspect.

According to the embodiments of the present invention, after receiving a call request sent by a user terminal, a switchboard device obtains recorded access number of a conference system to which a conference corresponding to a call missed by the user terminal belongs and a conference identifier of the conference, and enables the user terminal to access the conference according to the access number and the conference identifier, so that when missing a conference-related call, a user can directly access the conference by dialing a switchboard number, thereby improving the efficiency for accessing the conference.

BRIEF DESCRIPTION OF DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

Figure 1:
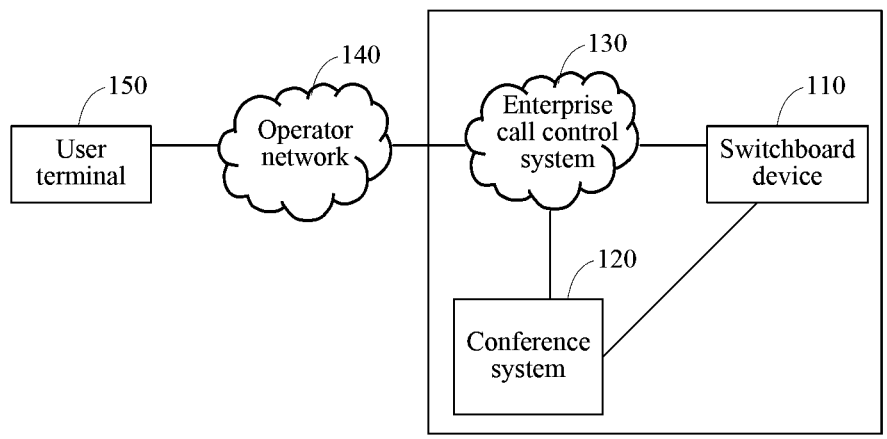
FIG. 1 is a schematic structural diagram of an implementation environment involved in an embodiment of the present invention.

FIG. 1 is a schematic structural diagram of an implementation environment involved in an embodiment of the present invention. The implementation environment includes a switchboard device 110, a conference system 120, an enterprise call control system 130, an operator network 140, and a user terminal 150. The switchboard device 110, the conference system 120, and the enterprise call control system 130 are located inside an enterprise network.

When the conference system 120 needs to call the user terminal 150 to access a conference, it sends to the switchboard device 110 a call request for calling the user terminal 150 to access the conference. The switchboard device 110 modifies the call request, so as to use a switchboard number corresponding to the switchboard device 110 as a calling identifier of the call request, and sends the modified call request to the user terminal 150 through the operator network 140. When the user terminal 150 rings, the call number displayed on the user terminal 150 is the switchboard number. Correspondingly, if the user terminal 150 misses the call, the missed call number displayed on the user terminal 150 is also the switchboard number.

When determining that the user terminal 150 misses the call, the switchboard device 110 records an access number of a conference system to which the conference belongs and a conference identifier of the conference. When the user terminal 150 uses the switchboard number to initiate a call, the call request sent by the user terminal 150 is routed to the switchboard device 110 by the operator network 140 and the enterprise call control system 130. After receiving the call request, the switchboard device 110 queries for the recorded access number of the conference system to which the conference belongs and the conference identifier of the conference, and accesses the user terminal 150 to the conference according to the access number and the conference identifier.

According to an embodiment of the present invention, when the user terminal 150 misses a conference-related call, it may directly access the conference by dialing the switchboard number, thereby improving the efficiency for accessing the conference.

Figure 2:
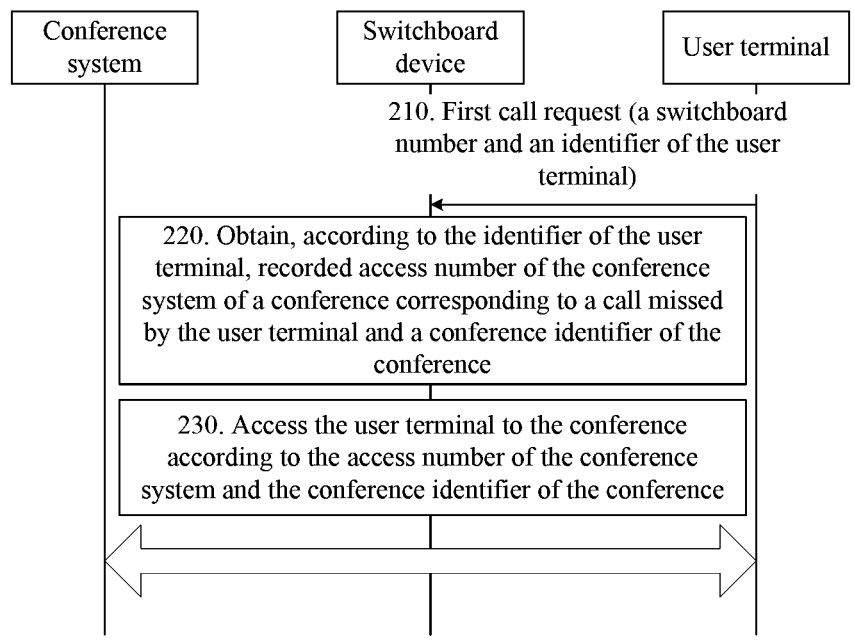
FIG. 2 is a schematic flowchart of a method according to Embodiment 1 of the present invention.

FIG. 2 is a schematic flowchart of a method for implementing conference access according to Embodiment 1 of the present invention.

Step 210: A user terminal sends a first call request to a switchboard device, where the first call request includes a calling identifier and a called identifier, the calling identifier is an identifier of the user terminal, and the called identifier is a switchboard number corresponding to the switchboard device.

Specifically, the first call request is routed to an enterprise call control system by an operator network, and the enterprise call control system routes the first call request to the switchboard device.

The identifier of the user terminal may specifically be a phone number of the user terminal, or may be an SIP URI of a user to which the user terminal belongs.

Step 220: The switchboard device obtains, according to the identifier of the user terminal, recorded information about a conference corresponding to a call missed by the user terminal, where the call missed by the user terminal is initiated by a conference system to the user terminal through the switchboard device, and the information about the conference includes an access number of the conference system and a conference identifier of the conference.

Step 230: The switchboard device enables the user terminal to access the conference according to the access number of the conference system and the conference identifier of the conference.

The information about the conference obtained in step 220 may further include description information of the conference, such as, a conference theme, a conference chairman, and participants. Before step 230, the method may further include: the switchboard device instructs the enterprise call control system to play the description information of the conference to the user terminal. Correspondingly, the enterprise call control system plays the description information of the conference to the user terminal according to an instruction of the switchboard device, and may specifically play the description information through an IVR (Interactive Voice Response, interactive voice response).

It should be noted that, if there are multiple conferences corresponding to the call missed by the user terminal and obtained by the switchboard device, the switchboard device may instruct the enterprise call control system to play obtained description information of the multiple conferences to the user terminal.

After instructing the enterprise call control system to play the description information of the conference to the user terminal, the switchboard device may further instruct the enterprise call control system to play (for example, through IVR) confirmation prompt information to the user terminal, so as to prompt a user to which the user terminal belongs to confirm the conference to be accessed. If there is only one conference corresponding to the call missed by the user terminal, the confirmation prompt information is used to prompt the user to confirm whether to access the conference; if there are multiple conferences corresponding to the call missed by the user terminal, the confirmation prompt information is used to prompt the user to select a conference to be accessed. Correspondingly, the switchboard device receives a confirmation result sent by the user terminal, and determines, according to the confirmation result, whether to enable the user terminal to access the conference, and if the switchboard device determines to enable the user terminal to access the conference, performs step 230.

Figure 3:
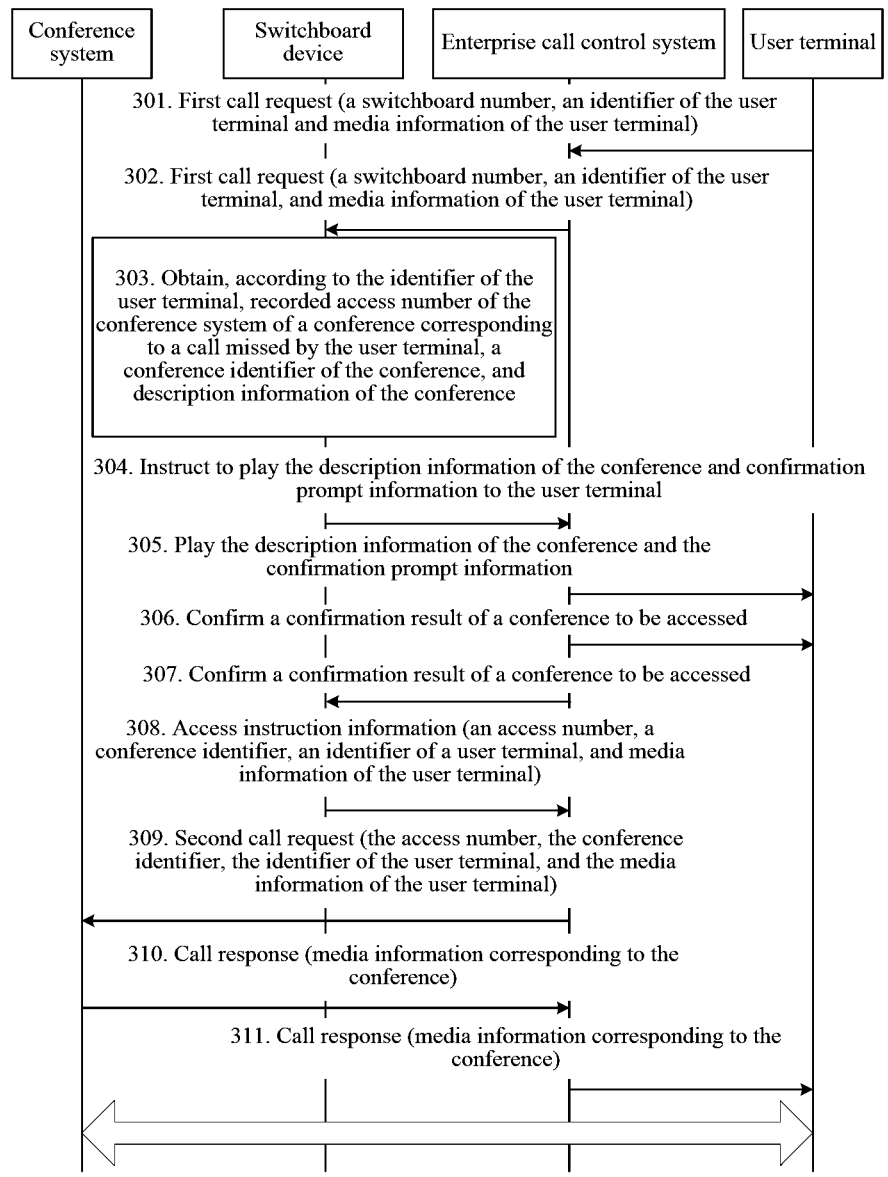
FIG. 3 is exemplary implementation manner M according to Embodiment 1 of the present invention.
Figure 4:
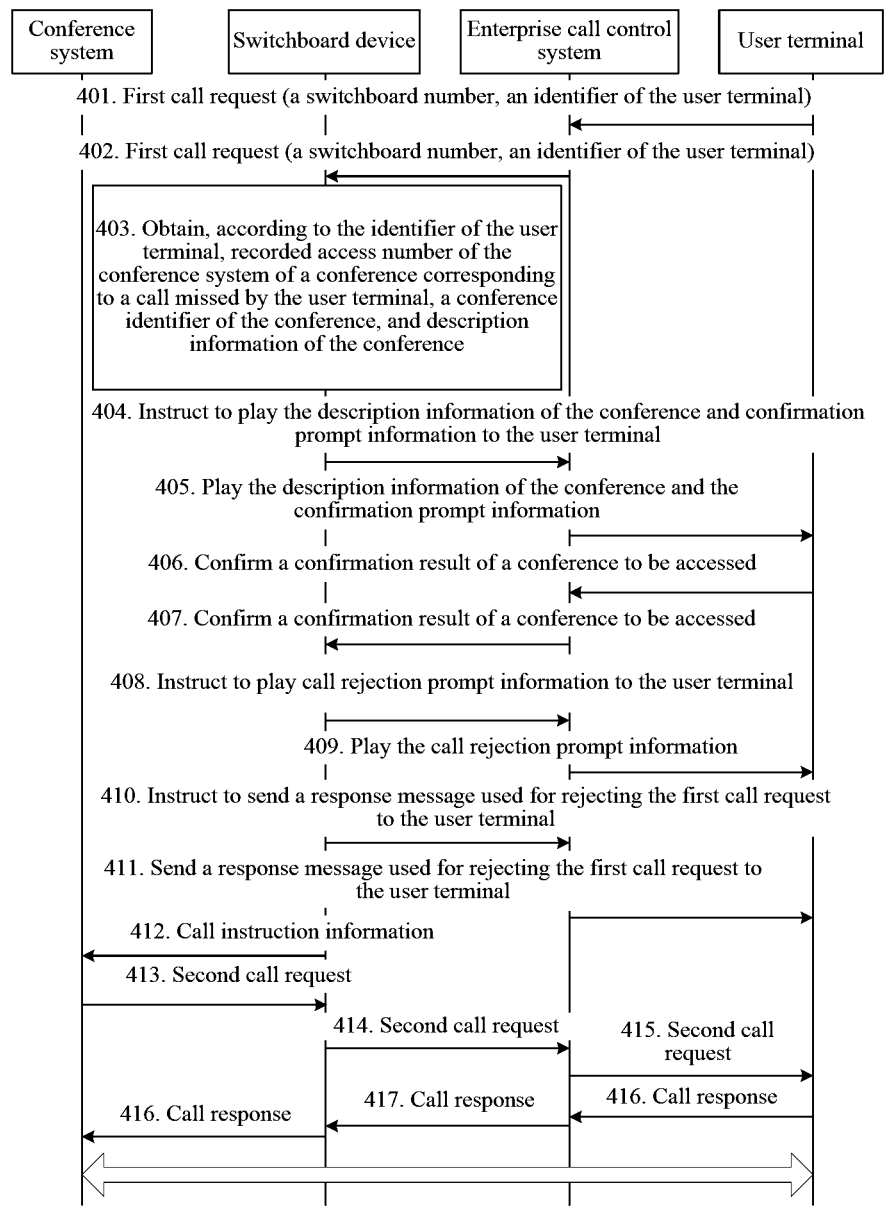
FIG. 4 is exemplary implementation manner N according to Embodiment 1 of the present invention.

With reference to FIG. 3 and FIG. 4, the following respectively describes two exemplary implementation manners:

exemplary implementation manner M and exemplary implementation manner N, in which the switchboard device enables the user terminal to access the conference after receiving the first call request sent by the user terminal.

In exemplary implementation manner M, the enabling, by the switchboard device, the user terminal to access the conference according to the access number of the conference system and the conference identifier of the conference specifically includes: instructing, by the switchboard device, the enterprise call control system to send a second call request that carries the conference identifier, the identifier of the user terminal, and media information of the user terminal to the conference system corresponding to the access number, so that the conference system sends media information corresponding to the conference identified by the conference identifier to the user terminal to enable the user terminal to access the conference.

With reference to FIG. 3, the following illustrates in detail exemplary implementation manner M.

Step 301-302: A user terminal sends a first call request to a switchboard device, where the first call request includes a calling identifier and a called identifier, the calling identifier is an identifier of the user terminal, and the called identifier is a switchboard number corresponding to the switchboard device.

The first call request further includes media information of the user terminal, such as an IP address and a port number of the user terminal for receiving media data, and a media type and a media format supported by the user terminal.

Specifically, the first call request is routed to an enterprise call control system by an operator network, and the enterprise call control system routes the first call request to the switchboard device. The first call request may specifically be an SIP (Session Initiation Protocol, session initiate protocol) INVITE (invite) message.

Step 303: The switchboard device obtains, according to the identifier of the user terminal, recorded information about a conference corresponding to a call missed by the user terminal, where the call missed by the user terminal is initiated by a conference system to the user terminal through the switchboard device, and the information about the conference includes an access number of the conference system, a conference identifier of the conference, and description information of the conference.

Step 304-305: The switchboard device instructs the enterprise call control system to play the description information of the conference and confirmation prompt information to the user terminal.

The confirmation prompt information is used to prompt a user to which the user terminal belongs to confirm the conference to be accessed.

If there is only one conference corresponding to the call missed by the user terminal, description information of the conference and the confirmation prompt information to be played is exemplarily as follows: Welcome to call company A. Your call will be transferred to a patent review session hosted by John. Please confirm whether to access the session; if you want to access the session, please dial 1#; and if you want to transfer to a conventional voice navigation menu, please dial * key.

If there are multiple conferences corresponding to the call missed by the user terminal, description information of the conference and the confirmation prompt information to be played is exemplarily as follows: Welcome to call company A. Your missed conference includes a patent review session hosted by John and a regular meeting of a project team hosted by Alice. Please confirm which conference to be accessed; if you want to access the patent review session hosted by John, please dial 1#; if you want to access the regular meeting of the project team hosted by Alice, please dial 2#; and if you want to transfer to a conventional voice navigation menu, please dial * key.

Preferably, if there is only one conference corresponding to the call missed by the user terminal, the switchboard device may also only instruct the enterprise call control system to play the description information of the conference to the user terminal, and directly enable the user terminal to access the conference (that is, directly perform step 308). Description information of the conference to be played is exemplarily as follows: Welcome to call company A. Your call will be transferred to a patent review session hosted by John. Please wait.

Step 306-307: The switchboard device receives, through the enterprise call control system, a confirmation result that confirms the conference to be accessed and is sent by the user terminal.

Step 308: The switchboard device sends access instruction information to the enterprise call control system, where the access instruction information includes an access number of the conference system, a conference identifier of the conference, an identifier of the user terminal, and media information of the user terminal.

Specifically, the switchboard device may carry the access instruction information into a response message of the first call request that is to be sent to the enterprise call control system.

Step 309: After receiving the access instruct information, the enterprise call control system sends a second call request to the conference system, where the second call request includes the access number of the conference system, the conference identifier of the conference, the identifier of the user terminal, and the media information of the user terminal.

It should be noted that, the access instruction information may also not include the identifier of the user terminal and the media information of the user terminal; and the enterprise call control system may extract the identifier of the user terminal and the media information of the user terminal from the first call request.

Step 310-311: The conference system sends media information corresponding to the conference to the user terminal through the enterprise call control system.

The media information corresponding to the conference may include: an IP address and a port number in the conference system for receiving media data corresponding to the conference, and a media type and a media format corresponding to the conference.

In step 310, the conference system may carry the media information corresponding to the conference in a call response of the second call request. The call response may specifically be a final response (for example, SIP 200 OK signaling), or may be a temporary response (for example, SIP 183 signaling).

In step 311, the enterprise call control system may carry the media information corresponding to the conference in a call response of the first call request. The call response may specifically be a final response (for example, SIP 200 OK signaling), or may be a temporary response (for example, SIP 183 signaling). The enterprise call control system may also carry the media information corresponding to the conference in SIP UPDATE (update) signaling or SIP Re-Invite (re-invite) signaling sent to the user terminal.

Through the above steps, the user terminal establishes a media channel with the conference system and accesses the conference.

Preferably, after step 310, the method may further include: the enterprise call control system sends a notification message to the switchboard device, for notifying the switchboard device that the user terminal has accessed the conference successfully. After receiving the notification message, the switchboard device records a state of the user as "the user has accessed the conference".

In exemplary implementation manner N, the enabling, by the switchboard device, the user terminal to access the conference according to the access number of the conference system and the conference identifier of the conference specifically includes: instructing, by the switchboard device, the enterprise call control system to send a response message used for rejecting the first call request to the user terminal; and sending call instruction information to the conference system corresponding to the access number, where the call instruction information includes the conference identifier and the identifier of the user terminal, for instructing the conference system to call the user terminal, so as to enable the user terminal to access the conference identified by the conference identifier. Preferably, before instructing the enterprise call control system to send the response message, the method further includes: instructing the enterprise call control system to send call rejection prompt information to the user terminal, where the call rejection prompt information is used to prompt the user to which the user terminal belongs, subsequently the call may be rejected and the conference system may actively enable the user terminal to access the conference. Enabling the user terminal to access the conference in exemplary implementation manner N can save the calling cost of the user.

With reference to FIG. 4, the following illustrates in detail exemplary implementation manner N.

Steps 401-407 are the same as steps 301-307.

Step 408-409: The switchboard device instructs the enterprise call control system to play the call rejection prompt information to the user terminal, where the enterprise call control system plays the call rejection prompt information.

The call rejection prompt information is used to prompt the user to which the user terminal belongs, and subsequently the call may be rejected and the conference system may actively enable the user terminal to access the conference. The played call rejection prompt information is exemplarily as follows: You just missed a voice conference at 14:30 from John. This call will be hung up, and the system will call you to access the conference in 5 s.

Step 410-411: The switchboard device instructs the enterprise call control system to send a response message used for rejecting the first call request to the user terminal, where the enterprise call control system send, according to an instruction of the switchboard device, the response message to the user terminal.

Step 412: The switchboard device sends call instruction information to the conference system.

The call instruction information includes the conference identifier and the identifier of the user terminal, for instructing the conference system to call the user terminal, so as to enable the user terminal to access the conference identified by the conference identifier.

Step 413: The switchboard device receives a second call request used for calling the user terminal to access the conference and sent by the conference system.

The second call request includes a calling identifier and a called identifier, where the calling identifier is an access number of the conference system and the called identifier is an identifier of the user terminal. The second call request further includes media information of the conference system, such as, an IP address and a port number in the conference system for receiving media data corresponding to the conference, and a media type and a media format corresponding to the conference.

Step 414-415: The switchboard device modifies the second call request, so as to replace the access number in the second call request with the switchboard number corresponding to the switchboard device, and send the modified second call request to the user terminal through the enterprise call control system.

Step 416-418: The user terminal sends a call response to the conference system.

The call response includes media information of the user terminal, such as an IP address and a port number of the user terminal for receiving media data, and a media type and a media format supported by the user terminal.

Through the above steps, the user terminal establishes a media channel with the conference system and accesses the conference.

Preferably, after step 417, the method may further include: recording, by the switchboard device, a state of the user as "the user has accessed the conference".

It should be noted that, the switchboard device may also first determine whether the user is a local user or a non-local user according to the identifier of the calling terminal. If the user is a local user, exemplary implementation manner M may be adopted to enable the user terminal to access the conference; if the user is a non-local user, exemplary implementation manner N may be adopted to enable the user terminal to access the conference, so as to save the calling cost of the non-local user.

Before step 210 of Embodiment 1 of the present invention, the method may further include: when the switchboard device calls the user terminal to access the conference in the conference system through the switchboard device and the user terminal misses the call, recording the information about the conference. Specifically, the switchboard device receives a call request for calling the user terminal to access the conference and sent by the conference system, where the calling identifier in the call request is the access number of the conference system; modifies the call request, so as to replace the access number in the call request with the switchboard number, sends the modified call request to the user terminal through the enterprise call control system; and when determining that the user terminal misses the call (for example, the user terminal misses the call when a timer times out or the user terminal rejects answering), records the information about the conference.

Exemplary, the information about the conference that is corresponding to the call missed by the user and is recorded by the switchboard device is shown in the following table:

| Identifier of the user terminal | Access number of the conference system | Conference identifier | Conference type | Conference time period | Conference state and user state |
|---|---|---|---|---|---|
| 139xxx | 60681 | 12345 | Voice | 09.25 14:00-14:30 | Conference has ended |
| | 60682 | 23456 | Voice + data | 09.25 14:30-16:00 | Conference is in session and the user has not accessed the conference |
| | 60682 | 34567 | Video | 09.25 15:00-15:30 | Conference is in session and the user has accessed the conference |

If the recorded conference has ended, the switchboard device may delete the recorded information about the conference, so the switchboard device may not obtain the information about the conference that has ended in step 220; or the switchboard device may not delete the information about the conference that has ended, but set the state of the recorded conference as "conference has ended", so the switchboard device does not obtain the information about the conference that has ended in step 220.

After step 230, the switchboard device may further update the user state in the table, and update the user state as "user has accessed the conference".

Figure 5:
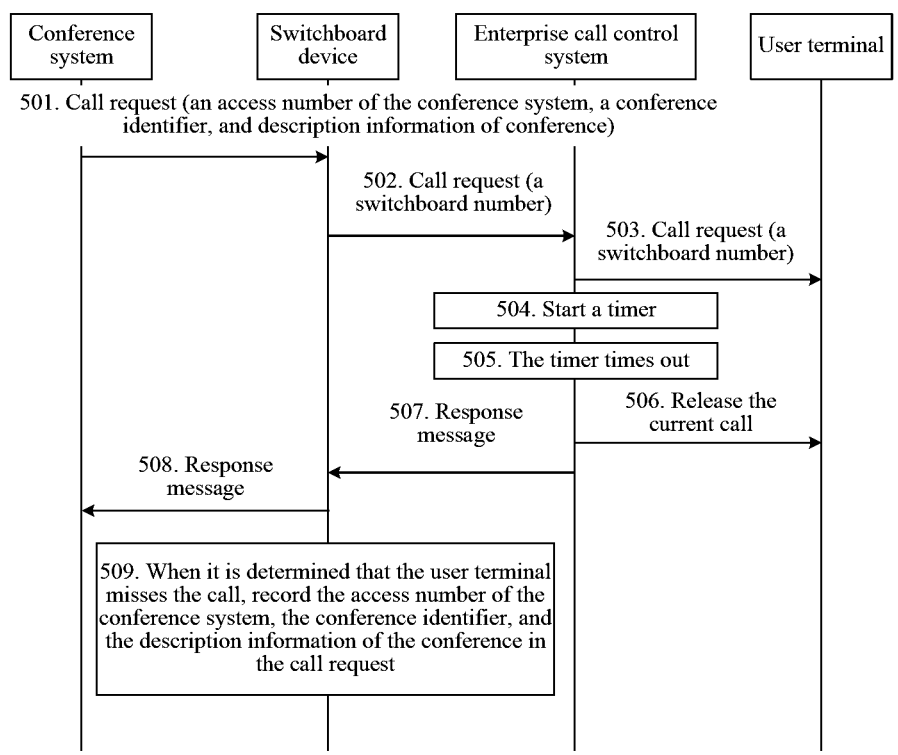
FIG. 5 is exemplary implementation manner A according to Embodiment 1 of the present invention.
Figure 6:
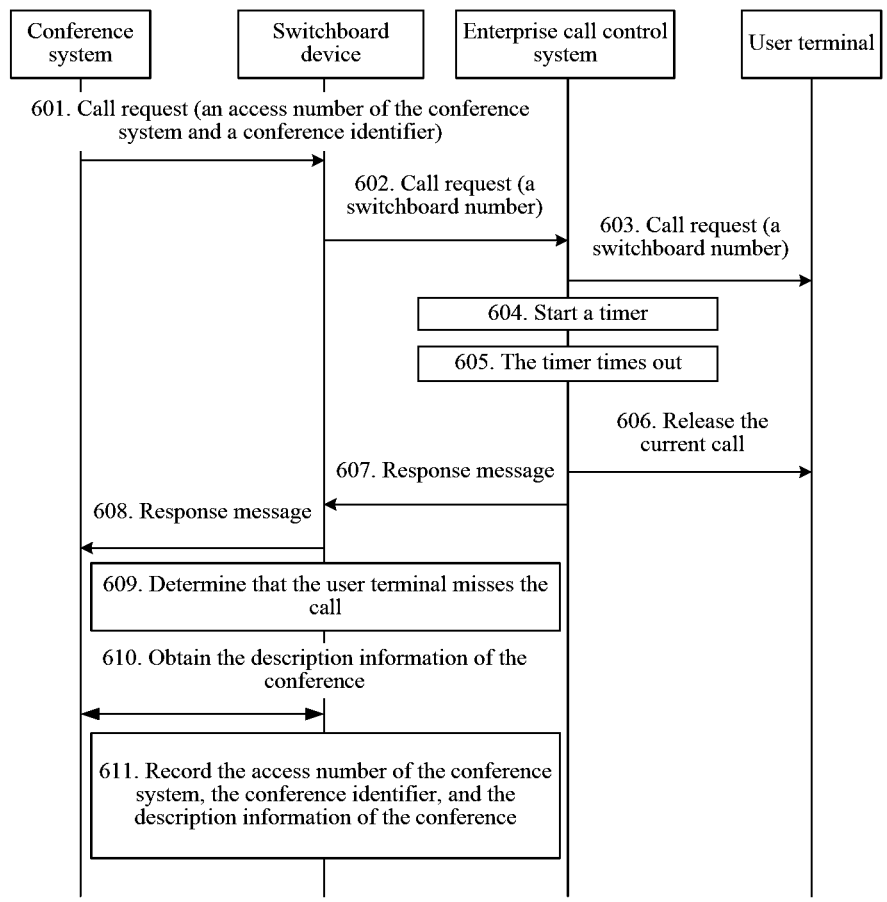
FIG. 6 is exemplary implementation manner B according to Embodiment 1 of the present invention.

With reference to FIG. 5 and FIG. 6, the following respectively describes two exemplary implementation manners: exemplary implementation manner A and exemplary implementation manner B, in which the switchboard device records the information about the conference.

Exemplary implementation manner A is shown in FIG. 5.

Step 501: A switchboard device receives a call request (for example, an SIP INVITE message) for calling a user terminal to access the conference and sent by a conference system, where a calling identifier (for example, a from field in the SIP INVITE message) in the call request is an access number of the conference system, and the call request further includes a conference identifier of the conference and description information of the conference.

Step 502-503: The switchboard device modifies the call request, so as to replace the access number in the call request with a switchboard number corresponding to the switchboard device, and send the modified call request to the user terminal through an enterprise call control system.

Step 504-508: The enterprise call control system starts a timer, if the timer times out and an off-hook message (for example, a 200 OK response in the SIP INVITE message) sent by the user terminal is not received yet, sends a cancel message (for example, an SIP CANCEL message) to the user terminal to release the current call, and sends, to the conference system through the switchboard device, a response message used for indicating that the call request is not responded to when the timer times out.

It should be noted that, the foregoing steps 504-508 are intended for a scenario where the user terminal misses the call when a timer times out. For a scenario where the user terminal rejects answering, steps 504-508 may be replaced with: the user terminal returns a response message used for rejecting the call request to the conference system.

Step 509: When determining, according to the response message, that the user terminal misses the call, the switchboard device records the access number, the conference identifier, and the description information of the conference in the call request.

Preferably, the switchboard device may further record the state of the user as "not access the conference".

It should be noted that, step 508 and step 509 may be in no particular order.

Exemplary implementation manner B is shown in FIG. 4.

Step 601: A switchboard device receives a call request (for example, an SIP INVITE message) for calling the user terminal to access a conference and sent by a conference system, a calling identifier (for example, a from field in the SIP INVITE message) in the call request is an access number of the conference system, and the call request further includes a conference identifier of the conference.

Steps 602-608 are the same as steps 502-508 in exemplary implementation manner A.

Step 609: The switchboard device determines, according to the response message, that the user terminal misses the call.

Step 610: The switchboard device obtains description information of the conference from the conference system.

Specifically, the switchboard device may send a new call request (for example, a new SIP INVITE message) to the conference system, and carry an instruction used to request to obtain the description information and information used to identify the conference into a message body of the new call request. The information used to identify the conference may be the conference identifier of the conference, or may be a unique identifier corresponding to the call request in step 601 (for example, a Call-ID corresponding to the SIP INVITE message in step 601). After receiving the new call request, the conference system obtains the description information of the conference according to the information used to identify the conference, and carries the description information in a response message of the returned new call request.

Step 611: The switchboard device records the access number and the conference identifier in the call request and the description information obtained in step 610.

The switchboard device may also record the access number and the conference identifier in the call request before step 610, and then record the description information after step 610.

Preferably, the switchboard device may further record the state of the user as "the user has not accessed the conference".

It should be noted that, the information about the conference recorded by the switchboard device may include information included in the first call request, or may include information obtained from the conference system. For example, in exemplary implementation manner A, the recorded access number, conference identifier, and description information are all information included in the call request; for another example, in exemplary implementation manner B, the recorded access number and the conference identifier are the access number and the conference identifier included in the call request, and the recorded description information is obtained from the conference system. In specific implementation, other manners may also exist, for example, if the call request includes the access number but does not include the conference identifier and the description information, correspondingly, the switchboard device records the access number in the call request and records the conference identifier and the description information obtained from the conference system. For another example, if the call request includes the access number, the conference identifier, and a part (for example, a conference theme) of the description information, the switchboard device records the access number, the conference identifier, and the part of the description information in the call request, and records the other part (for example, a conference chairman and participants) of the description information obtained from the conference system.

In Embodiment 1 of the present invention, the switchboard device may record information about conferences corresponding to all missed calls, or may only record the information about the conference for a subscriber. For example, an enterprise communication system establishes a service record table for each subscriber for the switchboard device to record information about a conference corresponding to a missed call of the subscriber, where the service record table may further record personal information of the subscriber, such as a subscriber introduction and the name of the company where the subscriber works.

When the conference system calls the user terminal to access the conference through the switchboard device and determines that the user terminal misses the call, the switchboard device determines whether a user to which the user terminal belongs is a subscriber, and if the user is a subscriber, records the information about the conference. Correspondingly, before step 220, the switchboard device determines whether a user to which the user terminal belongs is a subscriber, and if the user is a subscriber, perform step 220, and if the user is not a subscriber, perform no subsequent steps.

Further, the description information of the conference recorded in the service record table further includes user identifiers of participants of the conference. If other participants of the conference are subscribers, when obtaining the description information of the conference, the switchboard device may further obtain personal information of the other participants from service record tables of the other participants according to the user identifiers of the other participants, and instruct the enterprise call control system to push the personal information of the other participants to the user terminal.

For ease of description, the foregoing method embodiments are expressed as a series of action combinations. However, a person skilled in the art should know that, the present invention is not limited to the described action sequence because according to the present invention, some steps may be performed in other sequences or performed simultaneously. In addition, a person skilled in the art should know that, the embodiments described in the specification all belong to exemplary embodiments and the involved actions and modules are not necessarily needed for the present invention.

According to Embodiment 1 of the present invention, Embodiment 2 of the present invention provides a switchboard device 500.

Figure 7:
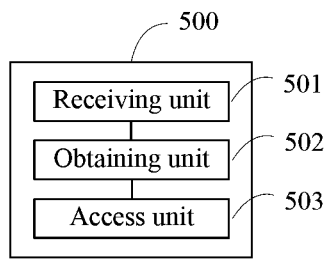
FIG. 7 to FIG. 10 are schematic structural diagrams of a switchboard device according to Embodiment 2 of the present invention.

As shown in FIG. 7, the switchboard device 500 includes: a receiving unit 501, an obtaining unit 502, and an access unit 503.

The receiving unit 501 is configured to receive, through an enterprise call control system, a first call request sent by a user terminal, where the first call request includes a calling identifier and a called identifier, the calling identifier is an identifier of the user terminal, and the called identifier is a switchboard number corresponding to the switchboard device; and is configured to transmit the first call request to the obtaining unit 502.

The obtaining unit 502 is configured to receive the first call request from the receiving unit 501, and obtain recorded information about a conference corresponding to a call missed by the user terminal according to the identifier of the user terminal included in the first call request, where the call missed by the user terminal is initiated by a conference system to the user terminal through the switchboard device, and the information about the conference includes an access number of the conference system and a conference identifier of the conference; and is configured to transmit the access number of the conference system and the conference identifier of the conference to the access unit 503.

The access unit 503 is configured to receive the access number of the conference system and the conference identifier of the conference from the obtaining unit 502, and enable the user terminal to access the conference according to the access number of the conference system and the conference identifier of the conference.

The access unit 503 may specifically be configured to receive the information about the conference from the obtaining unit 502, and instruct the enterprise call control system to send a second call request that carries the conference identifier, the identifier of the user terminal, and media information of the user terminal to the conference system corresponding to the access number, so that the conference system sends media information corresponding to the conference identified by the conference identifier to the user terminal to enable the user terminal to access the conference.

The access unit 503 may also be specifically configured to receive the information about the conference from the obtaining unit 502, instruct the enterprise call control system to send a response message used for rejecting the first call request to the user terminal, and send call instruction information to the conference system corresponding to the access number, where the call instruction information includes the conference identifier and the identifier of the user terminal, for instructing the conference system to call the user terminal identified by the identifier of the user terminal, so as to enable the user terminal to access a conference identified by the conference identifier.

Figure 8:
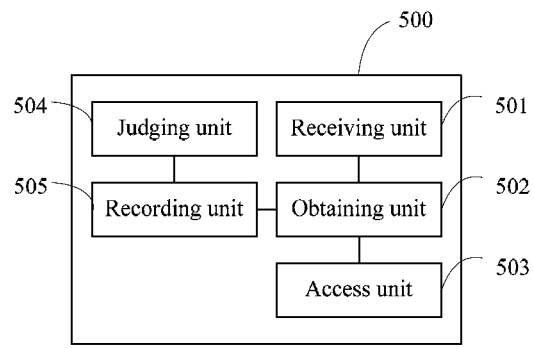

As shown in FIG. 8, the switchboard device may further include a judging unit 504 and a recording unit 505.

The judging unit 504 is configured to: when the conference system calls, through the switchboard device, the user terminal to access the conference, determine whether the user terminal misses the call, and transmit a judgment result to the recording unit 505.

The recording unit 505 is configured to receive the judgment result from the judging unit, and when the judgment result is yes, record the access number of the conference system and the conference identifier of the conference.

Figure 9:
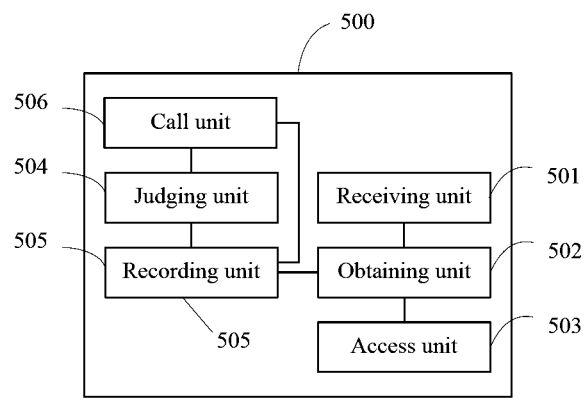

Further, as shown in FIG. 9, the switchboard device may further include a call unit 506, where the call unit 506 is configured to receive a third call request sent by the conference system for calling the user terminal to access the conference, where a calling identifier in the third call request is the access number of the conference system, and is further configured to modify the third call request, so as to replace the access number in the third call request with the switchboard number corresponding to the switchboard device, and send the modified third call request to the user terminal; and the recording unit 505 is specifically configured to receive the judgment result from the judging unit, and when the judgment result is yes, record the access number of the conference system in the third call request, and record the conference identifier of the conference obtained from the conference system; or the call unit 506 is configured to receive a fourth call request sent by the conference system for calling the user terminal to access the conference, where a calling identifier in the fourth call request is the access number of the conference system, and the fourth call request further includes the conference identifier of the conference, and is configured to modify the fourth call request, so as to replace the access number in the fourth call request with the switchboard number corresponding to the switchboard device, and send the modified fourth call request to the user terminal; and the recording unit 505 is specifically configured to receive the judgment result from the judging unit, and when the judgment result is yes, record the access number of the conference system and the conference identifier of the conference in the fourth call request.

Figure 10:
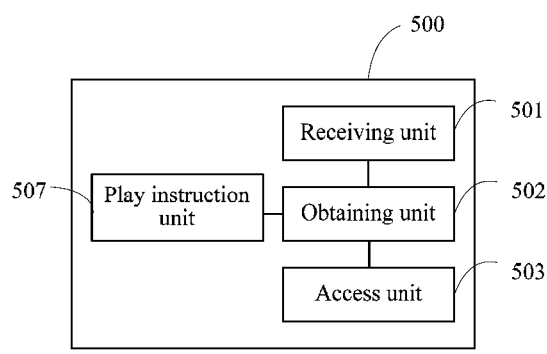

As shown in FIG. 10, the switchboard device may further include a play instruction unit 507.

The information about the conference further includes description information of the conference; the obtaining unit 502 is further configured to transmit the obtained description information of the conference to the play instruction unit 507; and the play instruction unit 507 is configured to receive the description information of the conference from the obtaining unit 502, and is configured to instruct the enterprise call control system to play the description information of the conference to the user terminal.

The play instruction unit 507 may be further configured to instruct the enterprise call control system to play confirmation prompt information to the user terminal, to prompt a user to which the user terminal belongs to confirm the conference to be accessed; correspondingly, the receiving unit 501 is further configured to receive a confirmation result that confirms the conference to be accessed and is sent by the user terminal, and transmit the confirmation result to the access unit 503; and the access unit 503 is specifically configured to receive the confirmation result from the receiving unit 501, receive the access number of the conference system and the conference identifier of the conference from the obtaining unit 502, and is configured to: when it is determined, according to the confirmation result, to enable the user terminal to access the conference, enable the user terminal to access the conference according to the access number of the conference system and the conference identifier of the conference.

The recording unit 505 may be further configured to: when the judgment result is yes, record the description information of the conference, and may specifically be configured to: when the judgment result is yes, record the description information of the conference obtained from the conference system.

The functional units described in Embodiment 2 of the present invention may be used to implement the method described in Embodiment 1.

Figure 11:
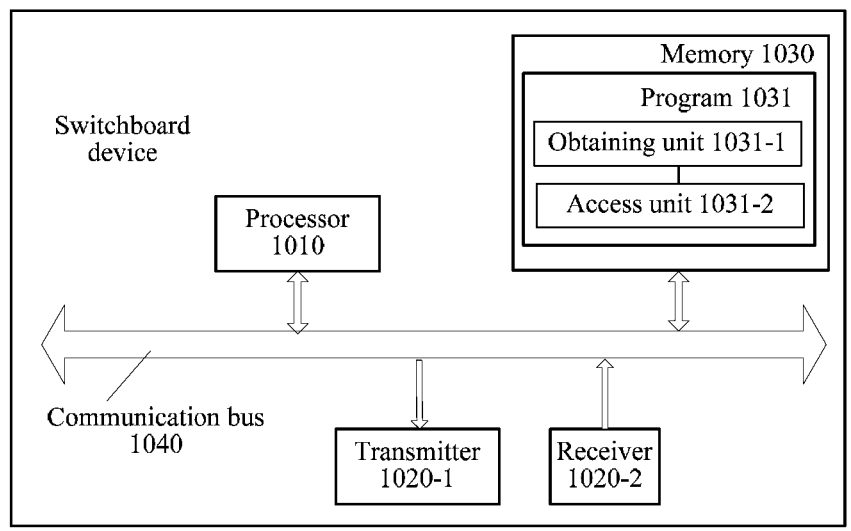
FIG. 11 is another schematic structural diagram of a switchboard device according to Embodiment 3 of the present invention.

As shown in FIG. 11, Embodiment 5 of the present invention provides a switchboard device 1000, including: a processor (processor) 1010, a transmitter (transmitter) 1020-1, a receiver (receiver) 1020-2, a memory (memory) 1030, and a bus 1040. Mutual communications between the processor 1010, the transmitter 1020-1, the receiver 1020-2, and the memory 1030 are completed using the bus 1040.

The transmitter 1020-1 and the receiver 1020-2 are configured to communicate with a network element, for example, to communicate with an enterprise call control system or a conference system.

The memory 1030 is configured to store a program 1031. Specifically, the program 1031 may include program code, where the program code includes a computer operating instruction. The memory 1030 may include a high-speed RAM memory, or may further include a non-volatile memory (non-volatile memory), for example, at least one disk memory.

The processor 1010 is configured to perform the program 1031 stored in the memory 1030. The processor 1010 may specifically be a central processing unit (CPU, central processing unit), and is a computer core unit.

Specifically, the program 1031 may include: an obtaining unit 1032-1 and an access unit 1032-2.

The receiver 1020-2 is configured to receive, through an enterprise call control system, a first call request sent by a user terminal, where the first call request includes a calling identifier and a called identifier, the calling identifier is an identifier of the user terminal, and the called identifier is a switchboard number corresponding to the switchboard device.

The obtaining unit 1032-1 is configured to obtain, according to the identifier of the user terminal included in the first call request, recorded information about a conference corresponding to a call missed by the user terminal, where the call missed by the user terminal is initiated by a conference system to the user terminal through the switchboard device, and the information about the conference includes an access number of the conference system and a conference identifier of the conference.

The access unit 1032-2 is configured to enable the user terminal to access the conference according to the access number of the conference system and the conference identifier of the conference.

The access unit 1032-2 may be specifically configured to instruct the enterprise call control system to send a second call request that carries the conference identifier, the identifier of the user terminal, and media information of the user terminal to the conference system corresponding to the access number, so that the conference system sends media information corresponding to the conference identified by the conference identifier to the user terminal to enable the user terminal to access the conference.

The access unit 1032-2 may be specifically configured to instruct the enterprise call control system to send a response message used for rejecting the first call request to the user terminal, and send call instruction information to the conference system corresponding to the access number, where the call instruction information includes the conference identifier and the identifier of the user terminal, for instructing the conference system to call the user terminal identified by the identifier of the user terminal, so as to enable the user terminal to access the conference identified by the conference identifier.

The program 1031 may further include a judging unit and a recording unit.

The judging unit is configured to: when the conference system calls, through the switchboard device, the user terminal to access the conference, determine whether the user terminal misses the call.

The recording unit is configured to: when a judgment result of the judging unit is yes, record the access number of the conference system and the conference identifier of the conference.

The program 1031 may further include a call unit, where the call unit is configured to receive a third call request sent by the conference system for calling the user terminal to access the conference, where a calling identifier in the third call request is the access number of the conference system, and is further configured to modify the third call request, so as to replace the access number in the third call request with the switchboard number corresponding to the switchboard device, and send the modified third call request to the user terminal; and the recording unit is specifically configured to: when the judgment result is yes, record the access number of the conference system in the third call request, and record the conference identifier of the conference obtained from the conference system; or the call unit is configured to receive a fourth call request sent by the conference system for calling the user terminal to access the conference, where a calling identifier in the fourth call request is the access number of the conference system, and the fourth call request further includes the conference identifier of the conference, and is configured to modify the fourth call request, so as to replace the access number in the fourth call request with the switchboard number corresponding to the switchboard device, and send the modified fourth call request to the user terminal; and the recording unit is specifically configured to: when the judgment result is yes, record the access number of the conference system and the conference identifier of the conference in the fourth call request.

The program 1031 may further include a play instruction unit; the information about the conference obtained by the obtaining unit 1031-2 further includes description information of the conference; and the play instruction unit is configured to instruct the enterprise call control system to play the description information of the conference to the user terminal.

The play instruction unit may be further configured to instruct the enterprise call control system to play confirmation prompt information to the user terminal, to prompt a user to which the user terminal belongs to confirm the conference to be accessed; correspondingly, the receiver 1020-2 is further configured to receive a confirmation result that confirms the conference to be accessed and is sent by the user terminal; and the access unit 1032-2 is specifically configured to: when it is determined, according to the confirmation result, to enable the user terminal to access the conference, enable the user terminal to access the conference according to the access number of the conference system and the conference identifier of the conference.

The recording unit may be further configured to: when the judgment result is yes, record the description information of the conference, and may be specifically configured to: when the judgment result is yes, record the description information of the conference obtained from the conference system.

For specific implementation of the units in the program 1032, reference is made to related units in Embodiment 2 of the present invention, which is not described herein again.

The functional units described in Embodiment 3 of the present invention may be used to implement the method described in Embodiment 1.

According to Embodiments 1 to 3 of the present invention, Embodiment 4 of the present invention provides a communication system 4000.

Figure 12:
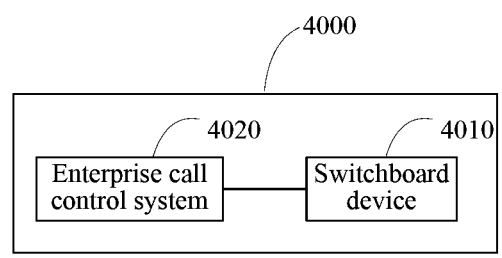
FIG. 12 to FIG. 13 are schematic structural diagrams of a system according to Embodiment 4 of the present invention.

As shown in FIG. 12, the communication system includes: the switchboard device 4010 and the enterprise call control system 4020 according to Embodiment 2 or 3.

Figure 13:
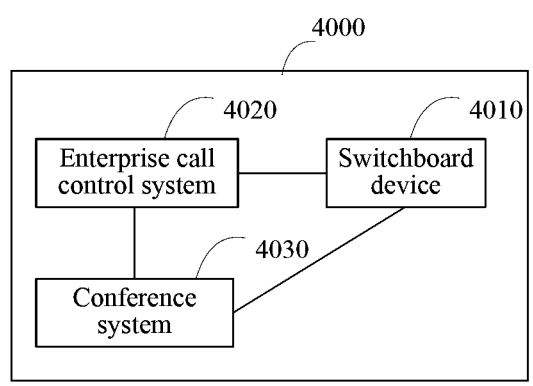

As shown in FIG. 13, the communication system may further include a conference system 4030.

The communication system described in Embodiment 4 of the present invention may be used to implement the method described in Embodiment 1.

A person of ordinary skill in the art may be aware that, in combination with the examples described in the embodiments disclosed in this specification, units and algorithm steps may be implemented by electronic hardware, or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, a detailed working process of the foregoing system, apparatus, and unit may refer to the corresponding process in the foregoing method embodiments, and the details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, multiple units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on multiple network units. A part or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of the present invention essentially, or the part contributing to the prior art, or a part of the technical solutions may be implemented in a form of a software product. The computer software product is stored in a storage medium, and includes several instructions for instructing a computer device (which may be a personal computer, a server, or a network device) to perform all or a part of the steps of the methods described in the embodiments of the present invention. The foregoing storage medium includes: any medium that can store program codes, such as a USB flash drive, a removable hard disk, a read-only memory (Read-Only Memory, ROM), a random access memory (Random Access Memory, RAM), a magnetic disk, or an optical disc.

The foregoing descriptions are merely specific embodiments of the present invention, but are not intended to limit the protection scope of the present invention. Any variation or replacement readily figured out by a person skilled in the art within the technical scope disclosed in the present invention shall fall within the protection scope of the present invention.

Therefore, the protection scope of the present invention shall be subject to the protection scope of the claims.

What is claimed is:

1. A method for conference access, the method comprising:
receiving, by a switchboard device through an enterprise call control system, a first call request, sent by a user terminal, wherein the first call request comprises a calling identifier and a called identifier, wherein the calling identifier is an identifier corresponding to the user terminal, and the called identifier is a switchboard number corresponding to the switchboard device;
obtaining, by the switchboard device, in response to a call initiated by a conference system to the user terminal through the switchboard device being missed by the user terminal, an access number of the conference system and a conference identifier of a conference corresponding to the missed call; and
enabling, by the switchboard device, the user terminal to access the conference based on the access number of the conference system and the conference identifier of the conference;
wherein before receiving the first call request, the method further comprises:
recording by the switchboard device the access number of the conference system and the conference identifier of the conference in response to the conference s stem calling through the switchboard device the user terminal to access the conference and determining that the user terminal misses the call.

2. The method according to claim 1, wherein the first call request comprises media information of the user terminal; and
wherein the enabling comprises:
instructing, by the switchboard device, the enterprise call control system to send a second call request that carries the conference identifier, the identifier of the user terminal, and the media information of the user terminal to the conference system corresponding to the access number, so that the conference system sends media information corresponding to the conference identified by the conference identifier to the user terminal to enable the user terminal to access the conference.

3. The method according to claim 1, wherein the enabling comprises:
instructing, by the switchboard device, the enterprise call control system to send a response message for rejecting the first call request to the user terminal; and
sending call instruction information to the conference system corresponding to the access number, wherein the call instruction information comprises the conference identifier and the identifier of the user terminal, for instructing the conference system to call the user terminal identified by the identifier of the user terminal, so as to enable the user terminal to access the conference identified by the conference identifier.

4. The method according to claim 1, wherein before the recording, the method further comprises:
receiving, by the switchboard device, a third call request, sent by the conference system for calling the user terminal to access the conference, wherein a calling identifier in the third call request is the access number of the conference system;
modifying, by the switchboard device, the third call request, so as to replace the access number in the third call request with the switchboard number corresponding to the switchboard device, and sending the modified third call request to the user terminal;
determining that the user terminal misses the call; and
obtaining the conference identifier of the conference from the conference system.

5. The method according to claim 1, wherein before the recording, the method further comprises:
receiving, by the switchboard device, a fourth call request sent by the conference system for calling the user terminal to access the conference, wherein a calling identifier in the fourth call request is the access number of the conference system, and the fourth call request further comprises the conference identifier of the conference;
modifying, by the switchboard device, the fourth call request, so as to replace the access number in fourth call request with the switchboard number corresponding to the switchboard device, and sending the modified fourth call request to the user terminal; and
determining that the user terminal misses the call.

6. The method according to claim 1, wherein the obtaining further comprises obtaining description information of the conference; and
wherein before the enabling, the method further comprises:
instructing, by the switchboard device, the enterprise call control system to play the description information of the conference to the user terminal.

7. The method according to claim 6, wherein after the instructing and before the enabling, the method further comprises:
instructing, by the switchboard device, the enterprise call control system to play confirmation prompt information to the user terminal, to prompt a user of the user terminal to confirm the conference to be accessed; and
receiving, by the switchboard device, a confirmation result that confirms the conference to be accessed and is sent by the user terminal, and determining, according to the confirmation result, to enable the user terminal to access the conference.

8. The method according to claim 6, wherein before receiving first call request, the method further comprises:
recording, by the switchboard device, the description information of the conference in response to the conference system calling, through the switchboard device, the user terminal to access the conference and the user terminal missing the call.

9. The method according to claim 8, wherein before recording the description information of the conference, the method further comprises:
obtaining the description information of the conference from the conference system.

10. A communication system comprising a switchboard device and an enterprise call control system, wherein:
the switchboard device is configured to:
receive, through the enterprise call control system, a first call request, sent by a user terminal, wherein the first call request comprises a calling identifier and a called identifier, wherein the calling identifier is an identifier of the user terminal, and wherein the called identifier is a switchboard number corresponding to the switchboard device;
obtain, in response to a call that is initiated by a conference system to the user terminal through the switchboard device being missed by the user terminal, an access number of the conference system and a conference identifier of a conference corresponding to the missed call; and enable the user terminal to access the conference based on the access number of the conference system and the conference identifier of the conference; and the enterprise call control system is configured to route the first call request to the switchboard device;

the switchboard device is further configured to record the access number of the conference system and the conference identifier of the conference in response to the conference system calling, through the switchboard device, the user terminal to access the conference and determining that the user terminal misses the call.

11. The communication system according to claim 10, wherein:

the switchboard device being configured to enable the user terminal to access the conference comprises:

the switchboard device being configured to enable the user terminal to access the conference comprises the switchboard device being configured to instruct the enterprise call control system to send a second call request that carriers the conference identifier, the identifier of the user terminal, and the media information of the user terminal to the conference system corresponding to the access number;

the enterprise call control system is further configured to send the second call request to the conference system based on instructions from the switchboard device; and the conference system is further configured to send media information corresponding to the conference identified by the conference identifier to the user terminal to enable the user terminal to access the conference after receiving the second call request.

12. A non-transitory computer processor-readable medium comprising computer processor-executable instructions for conference access, the computer processor-executable instructions comprising instructions for:

receiving through an enterprise call control system, a first call request, sent by a user terminal, wherein the first call request comprises a calling identifier and a called identifier, wherein the calling identifier is an identifier corresponding to the user terminal, and the called identifier is a switchboard number corresponding to the switchboard device;

obtaining, in response to a call initiated by a conference system to the user terminal through the switchboard device being missed by the user terminal, an access number of the conference system and a conference identifier of a conference corresponding to the missed call; and enabling the user terminal to access the conference based on the access number of the conference system and the conference identifier of the conference;

wherein the computer processor-executable instructions further comprise instructions for:

recording the access number of the conference system and the conference identifier of the conference in response to the conference system calling through the switchboard device the user terminal to access the conference and determining that the user terminal misses the call.

13. The non-transitory computer processor-readable medium according to claim 12, wherein the first call request comprises media information of the user terminal; and wherein the enabling comprises:

instructing the enterprise call control system to send a second call request that carries the conference identifier, the identifier of the user terminal, and the media information of the user terminal to the conference system corresponding to the access number, so that the conference system sends media information corresponding to the conference identified by the conference identifier to the user terminal to enable the user terminal to access the conference.

14. The non-transitory computer processor-readable medium according to claim 12, wherein the enabling comprises:

instructing the enterprise call control system to send a response message for rejecting the first call request to the user terminal; and sending call instruction information to the conference system corresponding to the access number, wherein the call instruction information comprises the conference identifier and the identifier of the user terminal, for instructing the conference system to call the user terminal identified by the identifier of the user terminal, so as to enable the user terminal to access the conference identified by the conference identifier.

15. The non-transitory computer processor-readable medium according to claim 12, wherein the computer processor-executable instructions further comprise instructions for:

receiving a third call request, sent by the conference system for calling the user terminal to access the conference, wherein a calling identifier in the third call request is the access number of the conference system;

modifying the third call request, so as to replace the access number in the third call request with the switchboard number corresponding to the switchboard device, and sending the modified third call request to the user terminal;

determining that the user terminal misses the call; and obtaining the conference identifier of the conference from the conference system.

16. The non-transitory computer processor-readable medium according to claim 12, wherein the computer processor-executable instructions further comprise instructions for:

receiving a fourth call request sent by the conference system for calling the user terminal to access the conference, wherein a calling identifier in the fourth call request is the access number of the conference system, and the fourth call request further comprises the conference identifier of the conference;

modifying the fourth call request, so as to replace the access number in fourth call request with the switchboard number corresponding to the switchboard device, and sending the modified fourth call request to the user terminal; and determining that the user terminal misses the call.

17. The non-transitory computer processor-readable medium according to claim 12, wherein the obtaining further comprises obtaining description information of the conference; and wherein the computer processor-executable instructions further comprise instructions for:

instructing the enterprise call control system to play the description information of the conference to the user terminal.

18. The non-transitory computer processor-readable medium according to claim 17, wherein the computer processor-executable instructions further comprise instructions for:

instructing the enterprise call control system to play confirmation prompt information to the user terminal, to prompt a user of the user terminal to confirm the conference to be accessed; and receiving a confirmation result that confirms the conference to be accessed and is sent by the user terminal, and determining, according to the confirmation result, to enable the user terminal to access the conference.

* * * * *

UNITED STATES PATENT AND TRADEMARK OFFICE
CERTIFICATE OF CORRECTION

Page 1 of 1

PATENT NO. : 8,982,737 B2
APPLICATION NO. : 14/138590
DATED : March 17, 2015
INVENTOR(S) : Liu et al.

It is certified that error appears in the above-identified patent and that said Letters Patent is hereby corrected as shown below:

In the claims

Column 23, line 25, "recording by the switchboard device the" should read -- recording, by the switchboard device, the --.

Column 23, line 27, "s stem" should read -- system --.

Signed and Sealed this
Twenty-ninth Day of December, 2015

Michelle K. Lee
*Director of the United States Patent and Trademark Office*